United States Patent
Xu et al.

(10) Patent No.: US 11,254,855 B2
(45) Date of Patent: Feb. 22, 2022

(54) SURFACTANT MIXTURES USED DURING CHEMICAL ENHANCED OIL RECOVERY AND METHODS OF USE THEREOF

(71) Applicant: Saudi Arabian Oil Company, Dhahran (SA)

(72) Inventors: Limin Xu, Beijing (CN); Ming Han, Beijing (CN); Alhasan Fuseni, Dhahran (SA); Dongqing Cao, Beijing (CN)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/683,761

(22) Filed: Nov. 14, 2019

(65) Prior Publication Data

US 2021/0147744 A1 May 20, 2021

(51) Int. Cl.
  *C09K 8/584* (2006.01)
  *E21B 43/16* (2006.01)

(52) U.S. Cl.
  CPC .............. *C09K 8/584* (2013.01); *E21B 43/16* (2013.01)

(58) Field of Classification Search
  None
  See application file for complete search history.

(56) References Cited

U.S. PATENT DOCUMENTS 3,811,504 A  5/1974 Flournoy et al.
5,441,541 A  8/1995 Mehreteab et al.
6,306,805 B1  10/2001 Bratescu et al.
6,528,070 B1  3/2003 Bratescu et al.
(Continued)

FOREIGN PATENT DOCUMENTS

CN  103540303 A  1/2014
CN  103540305 B  2/2016
(Continued)

OTHER PUBLICATIONS

International Search Report and Written Opinion dated Aug. 17, 2020 pertaining to International application No. PCT/US2020/012644 filed Jan. 8, 2020, 12 pgs.
(Continued)

*Primary Examiner* — Jeffrey D Washville
(74) *Attorney, Agent, or Firm* — Dinsmore & Shohl LLP (57) ABSTRACT

Surfactant mixtures include a cationic surfactant, an anionic surfactant, and a nonionic surfactant in a brine solution. The cationic surfactant may include at least one quaternary ammonium, at least one brominated trimethylammonium, or combinations thereof. The anionic surfactant may include at least one organosulfate. The nonionic surfactant may include the nonionic surfactant comprised of a polyoxyethylene fatty acid ester, a phenylated ethoxylate, or combinations thereof. The surfactant mixtures may be incorporated into methods for reducing the interfacial tension between the surfactant mixture and oily fluids during chemical enhanced oil recovery. The methods for reducing the interfacial tension may include introducing the surfactant mixture comprising a cationic surfactant, an anionic surfactant, and a nonionic surfactant in a brine solution to a hydrocarbon-bearing reservoir, thereby reducing the interfacial tension at a liquid-liquid interface of the surfactant mixture and the fluid.

21 Claims, 2 Drawing Sheets

(56) References Cited

U.S. PATENT DOCUMENTS

| | | | |
|---|---|---|---|
| 8,557,756 B2 | 10/2013 | Wu et al. | |
| 2001/0020531 A1 | 9/2001 | Varadaraj et al. | |
| 2008/0095733 A1* | 4/2008 | Griffin | C11D 3/046 |
| | | | 424/70.19 |
| 2008/0200565 A1 | 8/2008 | Harwell et al. | |
| 2011/0256085 A1* | 10/2011 | Talingting Pabalan | C08L 5/00 |
| | | | 424/70.13 |
| 2017/0313928 A1 | 11/2017 | Li et al. | |

FOREIGN PATENT DOCUMENTS

| | | |
|---|---|---|
| CN | 103422840 B | 12/2016 |
| WO | 2011080506 A1 | 7/2011 |
| WO | 2016040750 A1 | 3/2016 |

OTHER PUBLICATIONS

He et al. "Unique Mixtures of Anionic/Cationic Surfactants: A New Approach to Enhance Surfactant Performance in Liquids-Rich Shale Reservoirs" 2017, SPE-184515-MS, 10 pgs.

Li et al. "Mixtures of Anionic-Cationic Surfactants: A New Approach for Enhanced Oil Recovery in Low-Salinity, High-Temperature Sandstone Reservoir" 2014, SPE-169051-MS, 19 pgs.

Jia et al. "Systematic investigation of the effects of mixed cationic/anionic surfactants on the interfacial tension of a water/model oil system and their application to enhance crude oil recovery" Colloids and Surfaces A 529 (2017) 621-627, 7 pgs.

\* cited by examiner

SURFACTANT MIXTURES USED DURING CHEMICAL ENHANCED OIL RECOVERY AND METHODS OF USE THEREOF

TECHNICAL FIELD

The present specification generally relates to mixtures of surfactants and to methods incorporating the mixtures in order to reduce the interfacial tension between fluids. More particularly, the present specification is directed to introducing a surfactant mixture to a hydrocarbon-bearing reservoir in order to decrease the interfacial tension between reservoir fluids to enhance oil recovery.

BACKGROUND

Reservoir fluids often have high levels of interfacial tension (IFT). Chemical solutions are introduced to a reservoir during chemical enhanced oil recovery (CEOR) in order to decrease the IFT between the reservoir fluids and the chemical solutions. Reservoir fluids generally include crude oil, such as Arab Light Oil. Current chemical solutions are often alkaline or caustic solutions that are injected into the reservoirs that have naturally-occurring organic acids. However, once introduced to a reservoir, such chemical solutions do not show sustained, decreased IFT after exposure to the high-salinity and high-temperature reservoir conditions (that is, a salinity greater than or equal to about 55,000 parts per million (ppm) and a temperature greater than or equal to about 90 degrees Celsius (° C.)) as the chemical solutions become insoluble. Such insolubility results in formation damage and an unwanted increase in IFT. The increased IFT between the reservoir fluids and current chemical solutions results in decreased potential oil recovery from the hydrocarbon-bearing reservoir.

SUMMARY

Accordingly, there are ongoing needs for chemical mixtures that result in a decreased IFT at high-salinity and high-temperature conditions found in hydrocarbon-bearing reservoirs. Such chemical mixtures should exhibit increased levels of oil recovery during CEOR.

According to some embodiments of the present disclosure, a method for reducing the interfacial tension between a fluid and a surfactant mixture during chemical enhanced oil recovery includes introducing the surfactant mixture comprising a cationic surfactant, an anionic surfactant, and a nonionic surfactant in a brine solution to a hydrocarbon-bearing reservoir, thereby reducing the interfacial tension at a liquid-liquid interface of the surfactant mixture and the fluid. Based on their surface properties, surfactant molecules can adsorb droplets of fluid at the liquid-liquid interface by inserting the hydrophobic group into the fluid and placing the hydrophilic group in the water phase. Therefore, the fluid disperses in the water and forms a stable emulsion.

In certain embodiments, the cationic surfactant may include at least one quaternary ammonium, at least one brominated trimethylammonium, or combinations thereof. Further, the anionic surfactant may include at least one organosulfate. Finally, the nonionic surfactant may include a polyoxyethylene fatty acid ester, a phenylated ethoxylate, or combinations thereof. In some embodiments, the carbonated reservoir may have a salinity of greater than 55,000 ppm, a hardness of greater than 2,750 ppm, and a temperature of greater than or equal to 90° C.

Additional features and advantages of the embodiments described in the present disclosure will be set forth in the detailed description which follows, and in part will be readily apparent to those skilled in the art from that description or recognized by practicing the embodiments described in the present disclosure, including the detailed description which follows, the claims, as well as the appended drawings.

DETAILED DESCRIPTION

As used in this disclosure, the term "fluid" may refer to a hydrocarbon-bearing fluid, such as crude oil, natural gas, petroleum, diesel fuel, gasoline, or any other fluids that include an amount of hydrocarbons. Moreover, this term may include fluids of all phases, such as any substance that continually deforms (flows) under an applied shear stress, or external force. Examples of such substances include liquids, gases, and plasmas. In certain embodiments, the fluid may include water present in hydrocarbon-bearing reservoirs.

Chemical solutions are commonly injected into hydrocarbon-bearing reservoirs during chemical enhanced oil recovery (CEOR) so as to reduce the interfacial tension (IFT) between the reservoir fluid and the chemical solutions. Chemical solutions are generally alkaline or caustic solutions that are used to decrease the IFT so as to increase oil production. However, current chemical solutions tend to become ineffective at high-salinity and high-temperature conditions, defined here as a salinity of greater than 55,000 ppm and a temperature of greater than 90° C., which are common in fluid reservoirs. Therefore, surfactant mixtures comprising a cationic surfactant, an anionic surfactant, and a nonionic surfactant for decreasing the IFT of reservoir fluids, such as crude oil, in high-salinity and high-temperature conditions are particularly desired. Such surfactant mixtures may reduce the IFT by two to three orders of magnitude, thereby increasing oil production during commercial CEOR processes.

In general, chemical solutions used during CEOR decrease the IFT between the reservoir fluids and the chemical solutions. IFT is the amount of work (that is, units of force that may be measured in newtons) which must be expended in order to increase the size of the interface between two adjacent phases which do not mix completely with one another. The main forces involved in IFT are adhesive forces (tension) between the liquid phase of one substance and either a solid, liquid or gas phase of another substance. A measure of the IFT is millinewtons per meter (mN/m). A lesser IFT value signifies decreased IFT between the two adjacent phases, which is a desirable property as it correlates to increased oil recovery, while a greater IFT value signifies increased IFT between two adjacent phases. The surfactant mixture according to the present embodiments has decreased IFT at high-salinity and high-temperature conditions.

According to embodiments of the present disclosure, methods are disclosed for reducing the IFT between fluids, such as a surfactant mixture and reservoir fluids, during CEOR. These methods are believed to reduce the IFT in high-salinity and high-temperature conditions more effectively than conventional chemical solutions.

Accordingly, reference will now be made in detail to embodiments of methods for reducing the interfacial tension between fluids, such as a surfactant mixture comprising a cationic surfactant, an anionic surfactant, and a nonionic surfactant and reservoir fluids, such as crude oil or gas condensate, during CEOR.

A surfactant mixture according to embodiments includes a cationic surfactant, an anionic surfactant, and a nonionic surfactant. In some embodiments, the surfactant mixture is incorporated into a method for reducing the interfacial tension between fluids during CEOR. The method, according to embodiments, may include introducing the surfactant mixture comprising a cationic surfactant, an anionic surfactant, and a nonionic surfactant in a brine solution to a hydrocarbon-bearing reservoir, thereby reducing the interfacial tension at a liquid-liquid interface of the surfactant mixture and the fluid. Based on their surface properties, surfactant molecules may adsorb droplets of fluid by inserting the hydrophobic group into the fluid and placing the hydrophilic group in the water phase. Therefore, the fluid disperses in the water and forms a stable emulsion.

The surfactant mixture will now be described in detail. The surfactant mixture according to the present embodiments comprises a cationic surfactant. In some embodiments, the cationic surfactant may include a quaternary ammonium. The quaternary ammonium may have the formula $C_nH_{2n-4}XN$ (which will be referred to as "formula (I)"), in which X is a halogen. The subscript n denotes the number of repeating units of the chemical species in the formula (I). In some embodiments, subscript n ranges from 11 to 25, from 13 to 25, from 15 to 25, from 17 to 23, or from any other suitable range between 11 and 25. In embodiments, X is a halogen selected from fluorine, chlorine, bromine, or iodine. Suitable quaternary ammonium compounds include a halogenated cetylpyridinium, such as cetylpyridinium fluoride, cetylpyridinium chloride, cetylpyridinium bromide, or cetylpyridinium iodide. In certain embodiments, the cationic surfactant comprises cetylpyridinium bromide.

In other embodiments, the cationic surfactant may include a brominated trimethylammonium. The brominated trimethylammonium may have the formula $C_nH_{2n+4}BrN$ (which will be referred to as "formula (II)"). The subscript n denotes the number of repeating units of the chemical species in formula (II). In some embodiments, subscript n ranges from 3 to 25, from 9 to 25, from 13 to 25, from 15 to 25, from 15 to 21, from 15 to 19, or from any other suitable range between 3 and 25. As subscript n increases in value, the compatibility performance of the surfactant mixture, which will be described later in this disclosure in greater detail, may decrease. Therefore, in certain embodiments, subscript n is less than 15.

Suitable brominated trimethylammonium compounds may include trimethylammonium bromide, trimethylethanaminium bromide, triethylmethylammonium bromide, hexyltrimethylammonium bromide, trimethyloctylammonium bromide, decyltrimethylammonium bromide, dodecyltrimethylammonium bromide (DTAB), tetradecyltrimethylammonium bromide (TTAB), cetyltrimethylammonium bromide (CTAB), steartrimonium bromide (STAB), or combinations thereof. In certain embodiments, the cationic surfactant comprises DTAB.

Referring still to the surfactant mixture, the surfactant mixture according to embodiments further comprises an anionic surfactant. In some embodiments, the anionic surfactant may include an organosulfate. Suitable organosulfates include sodium dodecyl sulfate (SDS), ammonium lauryl sulfate (ALS), sodium laureth sulfate (SLES), sodium myreth sulfate (SMS), potassium lauryl sulfate (PLS), potassium dodecyl sulfate (PDS), or combinations thereof. In certain embodiments, the anionic surfactant comprises SDS.

The surfactant mixture according to embodiments further comprises a nonionic surfactant. In some embodiments, the nonionic surfactant may include at least one polyoxyethylene saturated fatty acid ester having the formula $C_nH_{2n}O_2(OCH_2CH_2)_m$ (which will be referred to as "formula (III)"). The subscripts m and n denote the number of repeating units of the chemical species in formula (III). In some embodiments, subscript m in formula (III) ranges from 1 to 40, from 3 to 38, from 5 to 36, from 7 to 34, from 9 to 32, from 11 to 30, from 13 to 28, from 15 to 26, from 17 to 24, or any other suitable range between 1 and 40. In one or more embodiments, subscript n in formula (III) ranges from 4 to 40, from 5 to 35, from 6 to 31, from 7 to 30, from 8 to 29, from 9 to 28, from 10 to 27, from 11 to 26, from 12 to 25, from 13 to 24, from 14 to 23, from 15 to 22, from 16 to 21, from 17 to 20, from 18 to 19, or any other suitable range between 4 and 40.

Non-limiting specific examples of polyoxyethylene saturated fatty acid esters according to formula (III) may include polyoxyethylenes of butyric, valeric, caproic, enanthic, caprylic, pelargonic, capric, undecylic, lauric, tridecylic, myristic, pentadecanoic, palmitic, margaric, stearic, nonadecylic, arachidic, heneicosylic, behenic, tricosylic, lignoceric, pentacosylic, cerotic, heptacosylic, montanic, nonacosylic, melissic, hentriacontylic, lacceroic, psyllic, geddic, ceroplastic, hexatriacontylic, heptatriacontanoic, octatriacontanoic, nonatriacontanoic, or tetracontanoic acids. In certain embodiments, the polyoxyethylene saturated fatty acid comprises polyoxyethylene stearate.

Referring still to the nonionic surfactant, in some embodiments, the nonionic surfactant may include at least one polyoxyethylene sorbitan saturated fatty acid ester having the formula $C_nH_{2n-2}O_6(OCH_2CH_2)_m$ (which will be referred to as "formula (IV)"). The subscript n denotes the number of repeating units of the chemical species in formula (IV). In some embodiments, subscript n in formula (IV) ranges from 18 to 24, from 18 to 22, or from 18 to 20, or any other suitable range between 18 and 24. In one or more embodiments, subscript m in formula (IV) ranges from 20 to 25 or from any other suitable range between 20 and 25. In certain embodiments, the polyoxyethylene sorbitan saturated fatty acid ester may include polyoxyethylene sorbitan monostearate. Suitable commercial embodiments of polyoxyethylene sorbitan saturated fatty acid ester nonionic surfactants include TWEEN® 60 from Sigma-Aldrich Co. (St. Louis, Mo.).

Referring still to the nonionic surfactant, in some embodiments, the nonionic surfactant may include at least one polyoxyethylene sorbitan unsaturated fatty acid ester having the formula $C_nH_{2n-4}O_6(OCH_2CH_2)_m$ (which will be referred to as "formula (V)"). The subscript n denotes the number of repeating units of the chemical species in formula (V). In some embodiments, subscript n in formula (V) ranges from 18 to 24, from 18 to 22, or from 18 to 20, or any other suitable range between 18 and 24. In one or more embodiments, subscript m in formula (V) ranges from 20 to 25 or from any other suitable range between 20 and 25.

Non-limiting specific examples of polyoxyethylene sorbitan unsaturated fatty acid esters according to formula (V) may include the polyoxyethylene sorbitan unsaturated fatty acid esters of oleic acid (such as oletate), elaidic acid, gondoic acid, erucic acid, nervonic acid, or mead acid. In certain embodiments, the polyoxyethylene sorbitan unsaturated fatty acid comprises oleate. Suitable commercial embodiments of polyoxyethylene unsaturated fatty acid nonionic surfactants include TWEEN® 80 from Sigma-Aldrich Co. (St. Louis, Mo.).

In further embodiments, the nonionic surfactant may include a phenylated ethoxylate according to the general formula (VI):

(VI)

In formula (VI), the subscript n denotes the number of repeating units of the chemical species. In some embodiments, subscript n ranges from 4 to 30, from 6 to 30, from 8 to 30, from 10 to 30, from 12 to 30, from 14 to 30, from 15 to 30, from 20 to 30, from 4 to 20, from 6 to 20, from 8 to 20, from 10 to 20, from 12 to 20, from 14 to 20, from 15 to 20, from 4 to 15, from 6 to 15, from 8 to 15, from 10 to 15, from 12 to 15, from 14 to 15, from 4 to 14, from 6 to 14, from 8 to 14, from 10 to 14, from 12 to 14, from 4 to 12, from 6 to 12, from 8 to 12, from 10 to 12, from 4 to 10, from 6 to 10, from 8 to 10, from 4 to 8, from 6 to 8, or any other range from 4 to 30. In certain embodiments, subscript n is 10. Suitable phenylated ethoxylate nonionic surfactants are commercially available as MAKON® OP-4, MAKON® OP-6, MAKON® OP-8, MAKON® OP-10, MAKON® OP-12, MAKON® OP-14, MAKON® OP-15, MAKON® OP-20, and MAKON® OP-30 from Stepan Co. (Northfield, Ill.).

In additional embodiments, the nonionic surfactant may include a phenylated ethoxylate according to the general formula (VII):

(VII)

In formula (VII), the subscript n denotes the number of repeating units of the chemical species. In these embodiments, subscript n is 9. Suitable phenylated ethoxylate nonionic surfactants are commercially available as MAKON® OP-9, MAKON® OP-10, MAKON® OP-13, MAKON® OP-15, or MAKON® OP-20, all of which are available from Stepan Co. (Northfield, Ill.).

In some embodiments, the surfactant mixture comprising the cationic surfactant, the anionic surfactant, and the nonionic surfactant is present in a brine solution. Suitable ranges of the surfactant mixture in the brine solution are from 0.001 percent by weight (wt. %) to 10 wt. %, from 0.01% to 1 wt. %, from 0.02 wt. % to 1 wt. %, from 0.03 wt. % to 1 wt. %, from 0.04 wt. % to 1 wt. %, from 0.05 wt. % to 1 wt. %, from 0.1 wt. % to 0.5 wt. %, from 0.1 wt. % to 0.25 wt. %, from 0.1 wt. % to 0.2 wt. %, from 0.12 wt. % to 0.18 wt. %, from 0.12 wt. % to 0.16 wt. %, from 0.14 wt. % to 0.16 wt. %, or from any range between 0.001 wt. % and 10 wt. %, based on the total weight of the brine solution. In certain embodiments, the surfactant mixture comprises from 0.14 wt. % to 0.16 wt. % of the brine solution, based on the total weight of the brine solution.

In further embodiments, the cationic surfactant and the anionic surfactant are present in the surfactant mixture in any suitable range. Suitable ranges of the cationic surfactant and the anionic surfactant in the surfactant mixture are from 1 wt. % to 99 wt. %, from 5 wt. % to 95 wt. %, from 10 wt. % to 90 wt. %, from 20 wt. % to 90 wt. %, from 30 wt. % to 90 wt. %, from 40 wt. % to 90 wt. %, from 50 wt. % to 90 wt. %, from 55 wt. % to 85 wt. %, from 60 wt. % to 85 wt. %, from 60 wt. % to 80 wt. %, from 65 wt. % to 80 wt. %, from 70 wt. % to 80 wt. %, or from any range between 1 wt. % and 99 wt. %, based on the total weight of the surfactant mixture. In certain embodiments, the cationic surfactant and the anionic surfactant are present in the surfactant mixture from 70 wt. % to 80 wt. %, based on the total weight of the surfactant mixture.

The mole ratio of cationic surfactant to the anionic surfactant present in the surfactant mixture may range from 1:10 to 10:1, based on the total weight of the surfactant mixture. Additional suitable mole ratios of cationic surfactant to the anionic surfactant present in the surfactant mixture are from 1:9 to 9:1, 1:8 to 8:1, 1:7 to 7:1, 1:6 to 6:1, 1:5 to 5:1, 1:4 to 4:1, 1:3 to 3:1, 2:1 to 1:2, 1:1, or from any ratio between 1:10 and 10:1, based on the total weight of the surfactant mixture. In certain embodiments, the ratio of cationic surfactant to the anionic surfactant present in the surfactant mixture ranges from 1:4 to 4:1 by mole ratio, based on the total weight of the surfactant mixture.

Referring still to the surfactant mixture, in additional embodiments, the nonionic surfactant is present in the surfactant mixture in any suitable range. Suitable ranges of the nonionic in the surfactant mixture are from 1 wt. % to 99 wt. %, from 2 wt. % to 90 wt. %, from 3 wt. % to 80 wt. %, from 4 wt. % to 70 wt. %, from 5 wt. % to 60 wt. %, from 6 wt. % to 50 wt. %, from 7 wt. % to 45 wt. %, from 8 wt. % to 40 wt. %, from 9 wt. % to 35 wt. %, from 10 wt. % to 30 wt. %, from 15 wt. % to 30 wt. %, from 20 wt. % to 30 wt. %, or from any range between 1 wt. % and 99 wt. %, based on the total weight of the surfactant mixture. In certain embodiments, the nonionic surfactant is present in the surfactant mixture from 20 wt. % to 30 wt. %, based on the total weight of the surfactant mixture.

The brine solution, according to embodiments, comprises a concentration of inorganic salts dissolved in water. The brine solution may include either naturally-occurring brines (for example, seawater) or synthetic brines. In some embodiments, the brine solution comprises one or more alkali or alkaline earth metal halides. Non-limiting specific examples suitable alkali or alkaline earth metal halides include calcium chloride, calcium bromide, sodium chloride, sodium bromide, magnesium chloride, magnesium bromide and combinations thereof.

Referring still to the brine solution, the brine solution may have a salinity of greater than 30,000 ppm. Other suitable salinity ranges may include a salinity of greater than 35,000 ppm, 40,000 ppm, 45,000 ppm, 50,000 ppm, 55,000 ppm, 60,000 ppm, 65,000 ppm, 70,000 ppm, 75,000 ppm, 80,000 ppm, 85,000 ppm, 90,000 ppm, 95,000 ppm, 100,000 ppm, 125,000 ppm, 150,000 ppm, 175,000 ppm, 200,000 ppm, or 220,000 ppm. Suitable salinity ranges may include a salinity of from 30,000 ppm to 220,000 ppm, from 35,000 ppm to 200,000 ppm, from 40,000 ppm to 175,000 ppm, from 45,000 ppm to 150,000 ppm, from 50,000 ppm to 125,000 ppm, from 55,000 ppm to 100,000 ppm, or from any other range between 30,000 ppm and 220,000 ppm.

Referring still to the brine solution, the brine solution may have a hardness of greater than 2,750 ppm. Other suitable hardness ranges may include a hardness of greater than 3,000 ppm, 3,250 ppm, 3,500 ppm, 3,750 ppm, 4,000 ppm, 4,250 ppm, 4,500 ppm, 4,750 ppm, or 5,000 ppm. Suitable hardness ranges may include a hardness of from 2,750 ppm to 5,000 ppm, from 3,000 ppm to 4,750 ppm, from 3,250 ppm to 4,500 ppm, from 3,500 ppm to 4,250 ppm, from 3,750 ppm to 4,000 ppm, or from any other range between 2,750 ppm and 5,000 ppm.

Referring again to the brine solution, the brine solution may have a temperature of greater than 90° C. in the hydrocarbon-bearing reservoir. Other suitable temperature ranges may include a temperature of greater than 95° C., 100° C., 105° C., 110° C., 115° C., 120° C., 125° C., 130° C., 140° C., 150° C., 160° C., 175° C., or 200° C. Suitable temperature ranges may include temperatures of from 95° C. to 200° C., from 100° C. to 200° C., from 100° C. to 175° C., from 100° C. to 150° C., from 100° C. to 125° C., from 125° C. to 200° C., from 125° C. to 175° C., from 125° C. to 150° C., from 150° C. to 200° C., from 150° C. to 175° C., or from any other range between 95° C. and 200° C.

The fluid, according to some embodiments, may include naturally-occurring fluids present in hydrocarbon-bearing reservoirs. Suitable fluids may include water, brine, oil, diesel fuel, petroleum-based fluids, or any other suitable fluids. In some embodiments, the fluid may include crude oil having an American Petroleum Institute (API) gravity ranging from 10° to 70°. Additional suitable API gravity of the fluid ranges are from 20° to 60°, from 20° to 50°, from 20° to 40°, from 25° to 40°, from 25° to 35°, from 27° to 34°, from 30° to 33°, or from 31° to 33°. In certain embodiments, the API gravity of the fluid is 31°.

Thus, various embodiments of surfactant mixtures have been described. Embodiments of methods for reducing the interfacial tension between fluids during CEOR will now be described. The methods may include one or more than one surfactant mixture according to any of the embodiments previously described.

Examples

The following examples illustrate one or more additional features of the present disclosure described previously. It should be understood that these examples are not intended to limit the scope of the disclosure or the appended claims in any manner.

In the following examples, surfactant mixtures were prepared and characterized for their suitability for decreasing IFT between the surfactant mixture and crude oil. Generally, the surfactant mixtures were tested by adding an amount of the surfactant mixture to a brine solution. In the tests, seawater was chosen as the brine solution, which had a salinity of 57,670 ppm and a hardness of 2,760 ppm. The surfactant mixture in the brine solution was heated to 95° C.

The surfactant mixture comprising only the cationic surfactant and the anionic surfactant produced precipitate at 95° C. In the following example, the cationic surfactant chosen was DTAB and the anionic surfactant chosen was SDS. The mole ratio of the DTAB to SDS, represented by the equation $n_{SDS}/n_{DTAB}$, ranged from 1:2 to 3:2, based on the total weight of the surfactant mixture. The surfactant mixture was added to the brine solution, in which the surfactant mixture comprised 0.2 wt. %, based on the total weight of the brine solution. The solutions were prepared and placed in an oven at 95° C. for 48 hours so as to gauge the compatibility of the mixture at high temperatures. As can be seen in Table 1, the 0.2 wt. % SDS/DTAB surfactant mixtures produced perception in every test at 95° C., demonstrating its incompatibility at high-temperature conditions. In all of the following tables, the letter "A" signifies a clear solution, the letter "B" signifies a slightly hazy solution, the letter "C" signifies a hazy solution, and the letter "D" signifies precipitation.

TABLE 1

Compatibility Test of Comparative 0.2 wt. % SDS/DTAB Mixtures at Differing Mixing Ratios

| $n_{SDS}/n_{DTAB}$ | 1:2 | 2:3 | 1:1 | 3:2 |
|---|---|---|---|---|
| 95° C. | D | D | D | D |

As can be seen in Table 1, all ratios of SDS to DTAB caused precipitation at 95° C. Such precipitation is due to strong electrostatic interaction.

Figure 1:
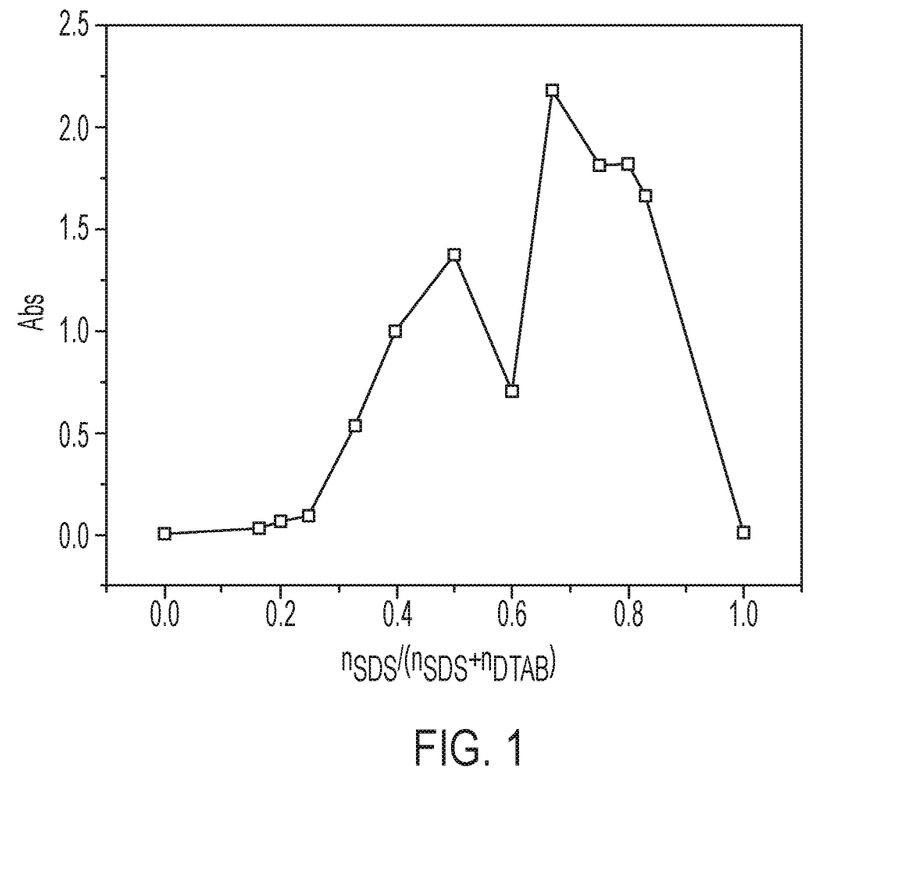
FIG. 1 is a graph of the absorbance of surfactant mixtures at various mixing ratios of the anionic surfactant and the cationic surfactant according to one or more embodiments of the present disclosure.

The absorbances of the solutions are shown in FIG. 1. FIG. 1 indicates that nearly all SDS/DTAB mixtures without the presence of a nonionic surfactant, especially those between 1:3 and 3:2, produced hazy solutions, signifying incompatibility of the SDS/DTAB mixtures at high temperatures. The equation $n_{SDS}/(n_{SDS}+n_{DTAB})$ shows how much SDS is present by mole ratio in the SDS/DTAB mixture.

However, when the precipitation cannot be dispersed in the solution, the absorbance values, shown in FIG. 1, are inaccurate parameters to measure the compatibility of the SDS/DTAB surfactant mixture. Instead, the IFTs between the DTAB, SDS, and mixtures thereof must be measured. Here, IFTs were measured using a spinning drop tensiometer and are listed in Table 2. By mixing SDS with DTAB at 1:5 and 1:4 ratios, the IFT was reduced by an order of magnitude, meaning that mixing a cationic surfactant with an anionic surfactant is one way to reduce IFT in certain conditions. Table 2 shows IFTs of SDS/DTAB surfactant mixtures, in which the SDS/DTAB surfactant mixture is present at 0.2 wt. %, based on the total weight of the brine solution.

TABLE 2

IFTs of Different 0.2 wt. % Surfactant Solutions.

| System | IFT (mN/m) |
|---|---|
| DTAB | 2.94 |
| SDS | 1.50 |
| 1:5 ratio of SDS to DTAB | 0.44 |
| 1:4 ratio of SDS to DTAB | 0.35 |

The same tests were conducted for SDS/CTAB mixtures. However, all SDS/CTAB mixtures precipitated, indicating decreased compatibility at high-temperature conditions. This decreased compatibility is due to reduced performance as the alkyl chain length of the cationic surfactant increases.

The same SDS/DTAB surfactant mixture described previously was again prepared. However, a nonionic surfactant was added to the surfactant mixture. Various nonionic surfactants were tested individually. The nonionic surfactant was added at 20 wt. %, based on the total weight of the surfactant mixture. Once the nonionic surfactant was added to the surfactant mixture, precipitation disappeared. This improvement is seen in Table 3.

TABLE 3

Compatibility Test of 0.16 wt. % SDS/DTAB, and 0.04 wt. % Nonionic Surfactant Mixtures at Differing SDS/DTAB Mixing Ratios at 95° C.

| $n_{SDS}/n_{DTAB}$ | 1:2 | 2:3 | 1:1 | 3:2 |
|---|---|---|---|---|
| Blank | D | D | D | D |
| MAKON ® OP-9 | B | B | B | B |
| MAKON ® OP-10 | B | B | B | B |
| MAKON ® OP-13 | B | B | B | B |
| MAKON ® OP-15 | B | B | B | B |
| MAKON ® OP-20 | B | B | B | B |
| Tween ® 60 | B | B | B | B |
| Tween ® 80 | B | B | B | B |

As such, the nonionic surfactants presented good solubility when used in conjunction with the SDS/DTAB mixture in a brine solution at high temperatures.

Table 4 shows results of a 0.2 wt. % surfactant mixture, in which SDS and TTAB are present at differing ratios at 0.14 wt. %, based on the total weight of the brine solution and various nonionic surfactants are present at 0.06 wt. %, based on the total weight of the brine solution.

TABLE 4

Compatibility Test of 0.14 wt. % SDS/TTAB, and 0.06 wt. % Nonionic Surfactant Mixtures at Differing SDS/TTAB Mixing Ratios at 95° C.

| $n_{SDS}/n_{TTAB}$ | 1:4 | 1:3 | 1:2 | 2:3 | 1:1 | 3:2 | 2:1 | 3:1 | 4:1 |
|---|---|---|---|---|---|---|---|---|---|
| Blank | A | C | B | D | D | D | D | D | D |
| MAKON ® OP-9 | C | C | B | B | B | B | B | D | D |
| MAKON ® OP-10 | A | C | B | B | B | B | B | B | C |
| MAKON ® OP-13 | A | D | C | B | B | B | B | C | C |
| MAKON ® OP-15 | A | A | C | B | B | B | B | C | C |
| MAKON ® OP-20 | A | A | B | B | C | B | C | C | C |
| Tween ® 60 | A | B | B | B | D | B | D | D | D |
| Tween ® 80 | A | A | B | B | B | B | D | D | D |

The nonionic surfactant mixtures of Table 4 presented mostly improved solubility when used in conjunction with the SDS/TTAB mixture in a brine solution at high temperatures as compared to the mixtures without nonionic surfactant. However, the mixtures comprising TTAB did not produce the consistently improved results when compared to the mixtures comprising DTAB. This slight decrease is due to reduced compatibility performance as the alkyl chain length of the cationic surfactant increases. These results indicate that as the alkyl chain length of the cationic surfactant increases, the compatibility performance decreases.

Table 5 shows results of a 0.2 wt. % surfactant mixture, in which SDS and CTAB are present at differing ratios at 0.14 wt. %, based on the total weight of the brine solution and various nonionic surfactants are present at 0.06 wt. %, based on the total weight of the brine solution.

TABLE 5

Compatibility Test of 0.14 wt. % SDS/CTAB, and 0.06 wt. % Nonionic Surfactant Mixtures at Differing SDS/CTAB Mixing Ratios at 95° C.

| $n_{SDS}/n_{CPB}$ | 1:4 | 1:3 | 1:2 | 2:3 | 1:1 | 3:2 | 2:1 | 3:1 | 4:1 |
|---|---|---|---|---|---|---|---|---|---|
| Blank | C | C | D | D | D | D | D | D | D |
| MAKON ® OP-9 | C | C | B | B | B | B | B | B | B |
| MAKON ® OP-10 | C | C | D | D | B | B | B | B | D |
| MAKON ® OP-13 | A | A | B | B | B | B | B | D | C |
| MAKON ® OP-15 | A | C | B | B | B | B | D | D | D |
| MAKON ® OP-20 | A | A | B | B | C | B | D | C | D |
| Tween ® 60 | C | D | B | B | D | B | B | D | D |
| Tween ® 80 | C | D | B | B | D | B | B | B | D |

The nonionic surfactants presented slightly decreased solubility compared to DTAB and TTAB when used in conjunction with the SDS/CTAB mixture in a brine solution at high temperatures. This slightly decreased compatibility is due to reduced compatibility performance as the alkyl chain length of the cationic surfactant increases. Again, these results indicate that as the alkyl chain length of the cationic surfactant increases, the compatibility performance decreases.

Table 6 shows results of a 0.2 wt. % surfactant mixture, in which SDS and CPB are present at differing ratios at 0.14 wt. %, based on the total weight of the brine solution and various nonionic surfactants are present at 0.06 wt. %, based on the total weight of the brine solution.

TABLE 6

Compatibility Test of 0.14 wt. % SDS/CPB, and 0.06 wt. % Nonionic Surfactant Mixtures at Differing SDS/CPB Mixing Ratios at 95° C.

| $n_{SDS}/n_{CTAB}$ | 1:4 | 1:3 | 1:2 | 2:3 | 1:1 | 3:2 | 2:1 | 3:1 | 4:1 |
|---|---|---|---|---|---|---|---|---|---|
| Blank | C | C | D | D | D | D | D | C | D |
| MAKON ® OP-9 | C | C | B | B | B | B | B | D | D |
| MAKON ® OP-10 | c | c | B | B | B | B | C | C | D |
| MAKON ® OP-13 | D | D | B | D | D | B | B | D | D |
| MAKON ® OP-15 | C | C | B | D | D | B | D | D | D |
| MAKON ® OP-20 | A | C | B | D | D | D | D | C | C |
| Tween ® 60 | C | C | B | C | D | D | B | B | D |
| Tween ® 80 | C | C | B | D | D | C | D | D | D |

Figure 2:
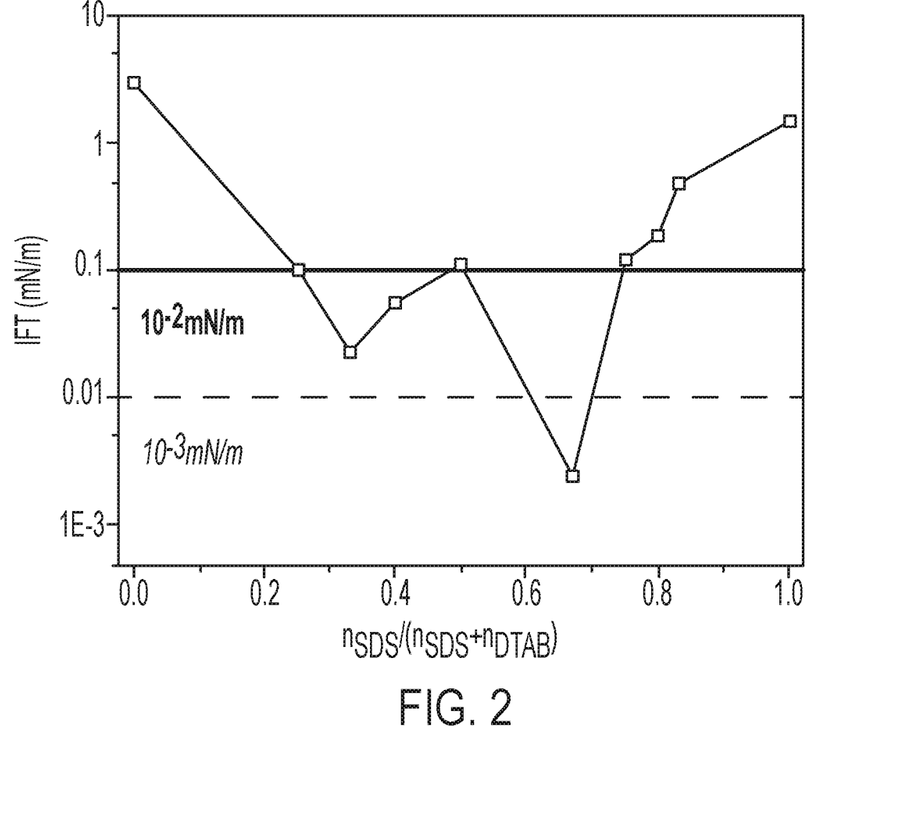
FIG. 2 is a graph of the interfacial tension between the present surfactant mixture and the crude oil at various mixing ratios of the anionic surfactant and the cationic surfactant according to one or more embodiments of the present disclosure.

Moreover, the IFT between the surfactant mixture and the crude oil greatly decreased. FIG. 2 shows the IFT between the surfactant mixture and the crude oil at various mixing ratios of the anionic surfactant and the cationic surfactant. At a ratio of 2:1 of SDS to DTAB, the IFT between the surfactant mixture and the crude oil ranged from $10^{-3}$ mN/m to $10^{-4}$ mN/m when MAKON® OP-10 was used as the nonionic surfactant.

The IFT results of this surfactant mixture is also seen in Table 7. In Table 7, SDS and DTAB are present, at differing ratios, at 0.16 wt. %, based on the total weight of the brine solution, and MAKON® OP-10 is always present at 0.04 wt. %, based on the total weight of the brine solution.

TABLE 7

IFT Measurements of 0.16 wt. % SDS/DTAB, and 0.04 wt. % MAKON ® OP-10 Mixtures at Differing SDS/DTAB Mixing Ratios at 90 °C.

| SDS/DTAB | IFT (mN/m) |
|---|---|
| 100% DTAB | 2.94 |
| 1:3 | 0.10 |

TABLE 7-continued

IFT Measurements of 0.16 wt. %
SDS/DTAB, and 0.04 wt. %
MAKON ® OP-10
Mixtures at Differing SDS/
DTAB Mixing Ratios at 90 °C.

| SDS/DTAB | IFT (mN/m) |
| --- | --- |
| 1:2 | $2.3 \times 10^{-2}$ |
| 2:3 | $5.4 \times 10^{-2}$ |
| 1:1 | 0.11 |
| 2:1 | $2.4 \times 10^{-3}$ |
| 3:1 | 0.12 |
| 4:1 | 0.19 |
| 5:1 | 0.47 |
| 100% SDS | 1.5 |

In sum, these results show that unwanted precipitation appeared when SDS was mixed with a cationic surfactant due to electrostatic interaction. By adding a nonionic surfactant, such as MAKON® OP-10, to the mixture, the compatibility at high temperatures greatly increased. As such, the IFT was reduced up to $10^{-3}$ mN/m at high temperatures.

Coreflooding tests were conducted according to the following procedure. First, the core plug was saturated with connate water by vacuum. Then, the coreflooding system was set up by pre-charging the accumulator with connate water, brine, crude oil, and chemical mixture in aqueous solution. Also, the core plug was loaded into the core holder. Once system setup was completed, the permeability of the brine was tested by setting the confining pressure to 600 psi and the back pressure to 100 psi. Water was injected into the core sample at different flow rates (that is, 0.5 cc/min, 1.0 cc/min, and 2.0 cc/min) and the differential in pressure produced was recorded. The brine permeability was then calculated using Darcy's Law.

After calculating the brine permeability, the core plug was removed from the set up, and saturated with crude oil by high speed centrifuge at 6,000 revolutions per minute (rpm) for 1 hour. The centrifuge direction was reversed and the core plug was again saturated with crude oil by high speed centrifuge at 6,000 rpm for 1 hour. The weight of the core plug was recorded both before and after saturation. The core plug was then aged at 95° C. for 3 weeks so as to recover the wettability.

The core plug was then loaded into the core holder. The confining pressure was set to 600 psi and the back pressure was set to 100 psi. Fresh crude oil was then injected into the core plug so as to displace the aged oil. Upon displacement, the temperature and pressure of the set up were adjusted so as to mirror reservoir conditions. As such, the temperature was adjusted to 96° C., the confining pressure was set at 4,500 psi, and the pore pressure was set at 3,100 psi.

After adjusting the set up conditions, the aged core plug was exposed to water and chemical flooding. The aged core plug was again flushed with fresh crude oil at three flow rates (that is, 0.5 cc/min, 1.0 cc/min, 2.0 cc/min, and 4.0 cc/min) to again displace any aged oil. Then, a brine flood injection was conducted at 0.5 cc/min. Following flooding, the aged core plug was injected with 1 pore volume (PV) of a surfactant mixture solution comprising SDS, DTAB, and MAKON® OP-10 at a flowrate of 0.5 cc/min. Finally, the aged core plug was injected at a flowrate of 0.5 cc/min with additional brine and surfactant mixture until 100% water cut, produced water content. The produced fluid mixture was then collected and the amount of oil volume produced by the coreflooding process was recorded.

Coreflooding using this surfactant mixture showed a significant increase in oil recovery. Specifically, the oil recovery was increased by 7.4% (see step 7) after the surfactant mixture comprising SDS, DTAB, and MAKON® OP-10 was injected when compared to a treatment using no surfactant mixture injection. Specifically, as can be seen in Table 8, oil recovery is increased by 7.4% after the surfactant mixture, as described in the present disclosure, was injected in step 6. Such an injection lowers the interfacial tension between the surfactant mixture and the fluids present in the hydrocarbon-bearing reservoirs, thereby increasing oil recovery upon a later seawater flush treatment.

TABLE 8

Summary of Oil Recovery Levels at
Various Steps During Coreflooding
using a Surfactant Mixture Comprising
SDS, DTAB, and MAKON ® OP-10.

| Step | fluid | Flow rate (cc/min.) | Injection volume (PV) | Oil recovery (%) |
| --- | --- | --- | --- | --- |
| 1 | Seawater | 0.5 | 3.7 | 37.9 |
| 2 | Seawater | 1 | 2.2 | 3.5 |
| 3 | Seawater | 2 | 2.2 | 3.0 |
| 4 | Seawater | 4 | 2.3 | 2.0 |
| 5 | Seawater | 0.5 | 0.4 | 0 |
| 6 | Chemical | 0.5 | 1.0 | 0 |
| 7 | Seawater | 0.5 | 7.4 | 7.4 |
| | Total | | 19.2 | 53.8 |

Moreover, Table 9 shows the results of a second chemical treatment, again using a mixture comprising SDS, DTAB, and MAKON® OP-10. As can be seen in Table 9, oil recovery was increased by an additional 1.4% (the sum of steps 6 and 7) after this surfactant mixture was injected when compared to a second treatment using a typical surfactant mixture injection. The typical surfactant mixture included 0.2 wt. % of an anionic surfactant (SDS), but included no cationic or nonionic surfactants.

TABLE 9

Summary of Oil Recovery Levels at
Various Steps During a Second Coreflooding
using a Surfactant Mixture Comprising
SDS, DTAB and MAKON ® OP-10.

| Step | fluid | Flow rate (cc/min.) | Injection volume (PV) | Oil recovery (%) |
| --- | --- | --- | --- | --- |
| 1 | Seawater | 0.5 | 2.6 | 39.1 |
| 2 | Seawater | 1 | 2.7 | 5.8 |
| 3 | Seawater | 2 | 2.6 | 6.4 |
| 4 | Seawater | 4 | 2.4 | 3.5 |
| 5 | Seawater | 0.5 | 0.8 | 0 |
| 6 | Chemical | 0.5 | 1 | 0.6 |
| 7 | Seawater | 0.5 | 6.2 | 0.8 |
| | Total | | 18.3 | 56.2 |

Therefore, surfactant mixtures according to previously described embodiments show potential for increasing oil recovery during CEOR.

According to one aspect of the present disclosure, a method for reducing the interfacial tension between a fluid and a surfactant mixture during chemical enhanced oil recovery includes introducing the surfactant mixture comprising a cationic surfactant, an anionic surfactant, and a nonionic surfactant in a brine solution to a hydrocarbon-bearing reservoir, thereby reducing the interfacial tension at a liquid-liquid interface of the surfactant mixture and the fluid. The cationic surfactant includes at least one quaternary ammonium, at least one brominated trimethylammonium, or combinations thereof; the anionic surfactant includes at least one organosulfate; the nonionic surfactant includes a polyoxyethylene fatty acid ester, a phenylated ethoxylate, or combinations thereof; and the brine solution has a salinity of greater than 30,000 ppm, a hardness of greater than 2,750 ppm, and a temperature of greater than or equal to 90° C.

A second aspect of the present disclosure may include the first aspect, in which the at least one quaternary ammonium has the formula $C_nH_{2n-4}XN$, where n ranges from 11 to 25 and X is a halogen.

A third aspect of the present disclosure may include the first aspect or the second aspect, in which the at least one brominated trimethylammonium has the formula $C_nH_{2n+4}BrN$, where n ranges from 3 to 25.

A fourth aspect of the present disclosure may include any of the first through third aspects, in which the at least one brominated trimethylammonium has the formula $C_nH_{2n+4}BrN$, where n ranges from 3 to 25.

A fifth aspect of the present disclosure may include any of the first through fourth aspects, in which in which the at least one brominated trimethylammonium is selected from dodecyltrimethylammonium bromide (DTAB), tetradecyltrimethylammonium bromide (TTAB), cetyltrimethylammonium bromide (CTAB), steartrimonium bromide (STAB), or combinations thereof.

A sixth aspect of the present disclosure may include any of the first through fifth aspects, in which the at least one organosulfate is selected from sodium dodecyl sulfate (SDS), ammonium lauryl sulfate (ALS), sodium laureth sulfate (SLES), sodium myreth sulfate (SMS), potassium lauryl sulfate (PLS), potassium dodecyl sulfate (PDS), or combinations thereof.

A seventh aspect of the present disclosure may include any of the first through sixth aspects, in which the anionic surfactant comprises SDS.

An eighth aspect of the present disclosure may include any of the first through seventh aspects, in which the polyoxyethylene fatty acid ester comprises at least one polyoxyethylene saturated fatty acid ester having the formula $C_nH_{2n}O_2(OCH_2CH_2)_m$, where m ranges from 1 to 40 and n ranges from 4 to 40.

A ninth aspect of the present disclosure may include any of the first through eighth aspects, in which the polyoxyethylene saturated fatty acid ester comprises polyoxyethylene stearate.

A tenth aspect of the present disclosure may include any of the first through ninth aspects, in which the polyoxyethylene fatty acid ester comprises at least one polyoxyethylene sorbitan saturated fatty acid ester having the formula $C_nH_{2n-2}O_6(OCH_2CH_2)_m$, where m ranges from 20 to 25 and n ranges from 18 to 24.

An eleventh aspect of the present disclosure may include any of the first through tenth aspects, in which the polyoxyethylene sorbitan saturated fatty acid ester comprises polyoxyethylene sorbitan monostearate.

A twelfth aspect of the present disclosure may include any of the first through eleventh aspects, in which the polyoxyethylene fatty acid ester comprises at least one polyoxyethylene sorbitan unsaturated fatty acid ester having the formula $C_nH_{2n-4}O_6(OCH_2CH_2)_m$, where m ranges from 20 to 25 and n ranges from 18 to 24.

A thirteenth aspect of the present disclosure may include any of the first through twelfth aspects, in which the polyoxyethylene sorbitan unsaturated fatty acid comprises oleate.

A fourteenth aspect of the present disclosure may include any of the first through thirteenth aspects, in which the nonionic surfactant comprises at least one phenylated ethoxylate according to formula (I) in which n is an integer from 4 to 30.

A fifteenth aspect of the present disclosure may include any of the first through fourteenth aspects, in which n is 10.

A sixteenth aspect of the present disclosure may include any of the first through fifteenth aspects, in which the brine solution comprises from 0.01 wt. % to 1.0 wt. % of the surfactant mixture, based on the total weight of the brine solution.

A seventeenth aspect of the present disclosure may include any of the first through sixteenth aspects, in which the surfactant mixture comprises from 50 wt. % to 99.9 wt. % of the cationic surfactant and the anionic surfactant, based on the total weight of the surfactant mixture.

An eighteenth aspect of the present disclosure may include any of the first through seventeenth aspects, in which the surfactant mixture comprises from 0.01% wt. % to 50 wt. % of the nonionic surfactant, based on the total weight of the surfactant mixture.

A nineteenth aspect of the present disclosure may include any of the first through eighteenth aspects, in which the brine solution comprises one or more alkali or alkaline earth metal halides.

A twentieth aspect of the present disclosure may include any of the first through nineteenth aspects, in which the one or more alkali or alkaline earth metal halides is chosen from calcium chloride, calcium bromide, sodium chloride, sodium bromide, magnesium chloride, magnesium bromide, or combinations thereof.

A twenty-first aspect of the present disclosure may include any of the first through twentieth aspects, in which the ratio of the cationic surfactant to the anionic surfactant comprises from 1:4 to 4:1 by mole ratio, based on the total weight of the surfactant mixture.

It should be apparent to those skilled in the art that various modifications and variations may be made to the embodiments described in the present disclosure without departing from the spirit and scope of the claimed subject matter. Thus it is intended that the specification cover the modifications and variations of the various embodiments described in the present disclosure provided such modifications and variations come within the scope of the appended claims and their equivalents.

What is claimed is:

1. A method for reducing the interfacial tension between a reservoir fluid and a surfactant mixture during chemical enhanced oil recovery, the method comprising:
   introducing the surfactant mixture comprising a cationic surfactant, an anionic surfactant, and a nonionic surfactant in a brine solution to a hydrocarbon-bearing reservoir, thereby reducing the interfacial tension at a liquid-liquid interface of the surfactant mixture and the fluid, in which:
   the cationic surfactant comprises at least one quaternary ammonium, at least one brominated trimethylammonium, or combinations thereof;
   the anionic surfactant comprises at least one organosulfate;

the nonionic surfactant comprises a polyoxyethylene fatty acid ester, a phenylated ethoxylate, or combinations thereof; and the brine solution has a salinity of greater than 30,000 ppm, a hardness of greater than 2,750 ppm, and a temperature of greater than or equal to 90° C., in which the brine solution comprises from 0.001 wt. % to 0.2 wt. % of the surfactant mixture, based on the total weight of the brine solution.

2. The method of claim 1, in which the at least one quaternary ammonium has the formula $C_nH_{2n-4}XN$, where n ranges from 11 to 25 and X is a halogen.

3. The method of claim 2, in which the at least one quaternary ammonium comprises cetylpyridinium bromide.

4. The method of claim 1, in which the at least one brominated trimethylammonium has the formula $C_nH_{2n+4}BrN$, where n ranges from 3 to 25.

5. The method of claim 4, in which the at least one brominated trimethylammonium is selected from dodecyltrimethylammonium bromide (DTAB), tetradecyltrimethylammonium bromide (TTAB), cetyltrimethylammonium bromide (CTAB), steartrimonium bromide (STAB), or combinations thereof.

6. The method of claim 1, in which the at least one organosulfate is selected from sodium dodecyl sulfate (SDS), ammonium lauryl sulfate (ALS), sodium laureth sulfate (SLES), sodium myreth sulfate (SMS), potassium lauryl sulfate (PLS), potassium dodecyl sulfate (PDS), or combinations thereof.

7. The method of claim 1, in which the anionic surfactant comprises SDS.

8. The method of claim 1, in which the polyoxyethylene fatty acid ester comprises at least one polyoxyethylene saturated fatty acid ester having the formula $C_nH_{2n}O_2(OCH_2CH_2)_m$, where m ranges from 1 to 40 and n ranges from 4 to 40.

9. The method of claim 8, in which the polyoxyethylene saturated fatty acid ester comprises polyoxyethylene stearate.

10. The method of claim 1, in which the polyoxyethylene fatty acid ester comprises at least one polyoxyethylene sorbitan saturated fatty acid ester having the formula $C_nH_{2n-2}O_6(OCH_2CH_2)_m$, where m ranges from 20 to 25 and n ranges from 18 to 24.

11. The method of claim 10, in which the polyoxyethylene sorbitan saturated fatty acid ester comprises polyoxyethylene sorbitan monostearate.

12. The method of claim 1, in which the polyoxyethylene fatty acid ester comprises at least one polyoxyethylene sorbitan unsaturated fatty acid ester having the formula $C_nH_{2n-4}O_6(OCH_2CH_2)_m$, where m ranges from 20 to 25 and n ranges from 18 to 24.

13. The method of claim 12, in which the polyoxyethylene sorbitan unsaturated fatty acid comprises oleate.

14. The method of claim 1, in which the nonionic surfactant comprises at least one phenylated ethoxylate according to formula (I):

(I)

in which n is an integer from 4 to 30.

15. The method of claim 1, in which the surfactant mixture comprises from 50 wt. % to 99.9 wt. % of the cationic surfactant and the anionic surfactant, based on the total weight of the surfactant mixture.

16. The method of claim 15, in which the surfactant mixture comprises from 0.01% wt. % to 50 wt. % of the nonionic surfactant, based on the total weight of the surfactant mixture.

17. The method of claim 1, in which the brine solution comprises one or more alkali or alkaline earth metal halides.

18. The method of claim 17, in which the one or more alkali or alkaline earth metal halides is chosen from calcium chloride, calcium bromide, sodium chloride, sodium bromide, magnesium chloride, magnesium bromide, or combinations thereof.

19. The method of claim 1, in which the ratio of the cationic surfactant to the anionic surfactant comprises from 1:4 to 4:1 by mole ratio, based on the total weight of the surfactant mixture.

20. The method of claim 1, in which the at least one brominated trimethylammonium is dodecyltrimethylammonium bromide (DTAB), and the at least one organosulfate is sodium dodecyl sulfate (SDS).

21. The method of claim 20, in which the mole ratio of the DTAB to SDS is ranged from 1:2 to 3:2 based on the total weight of the surfactant mixture.

* * * * *